United States Patent [19]

Lavit et al.

[11] Patent Number: 5,472,275
[45] Date of Patent: Dec. 5, 1995

[54] ASSEMBLY FOR THE CONTINUOUS PLASTICISING AND FILTRATION OF MATERIALS

[75] Inventors: Eric Lavit, Villeneuve Saint Georges, France; Alexandre Rog, Kiev, Ukraine

[73] Assignee: Societe De Construction, France

[21] Appl. No.: 88,771

[22] Filed: Jul. 8, 1993

[30] Foreign Application Priority Data

Jul. 10, 1992 [FR] France .................... 92 08590

[51] Int. Cl.⁶ .................................................. B01F 15/06
[52] U.S. Cl. ........................ 366/145; 366/79; 366/87
[58] Field of Search ................... 366/79, 83–85, 366/87, 96–99, 145, 146, 149, 318, 321; 425/204, 208, 209

[56] References Cited

U.S. PATENT DOCUMENTS

| | | | |
|---|---|---|---|
| 3,375,549 | 4/1968 | Geyer | 366/83 |
| 3,751,014 | 8/1973 | Waterloo | 366/79 |
| 3,811,659 | 3/1974 | Taylor | 366/87 |
| 3,981,658 | 9/1976 | Briggs | 425/208 |
| 4,227,870 | 10/1980 | Kim | 366/79 |
| 4,408,887 | 10/1983 | Yamaoka | 366/79 |
| 4,802,140 | 1/1989 | Dowling | 425/204 |

FOREIGN PATENT DOCUMENTS 1153678  5/1969  United Kingdom ............... 366/79

*Primary Examiner*—David Scherbel
*Assistant Examiner*—Terrence R. Till
*Attorney, Agent, or Firm*—Wolf, Greenfield & Sacks

[57] ABSTRACT

Assembly for the continuous plasticising and filtration of materials. The materials include polymers in the pasty, viscous, or molten state, visco-elastic products and proteoleaginous products. The assembly includes two modules, a plasticising module and a degassing and filtration module. A stator accommodates a floating screw and, in succession, a feed zone receiving the material to be plasticised, a homogenization zone, a degassing zone, a zone for the filtration of the non-molten material, and a zone for the outlet of the plasticised material. The portions of the stator which correspond to the various zones are provided with temperature regulating means, formed of a condenser, a heating device, and an annular chamber.

8 Claims, 5 Drawing Sheets

ASSEMBLY FOR THE CONTINUOUS PLASTICISING AND FILTRATION OF MATERIALS

BACKGROUND OF THE INVENTION

1. Field of the Invention

The present invention relates to an assembly for the continuous plasticising and filtration of materials such as polymers in the pasty, viscous or molten state, or similar products.

2. Description of the Prior Art

Numerous plasticising devices exist which are composed of a stator and a screw which mix the products received to form a homogeneous paste.

These various installations are distinguished by the shape of the screw threads, the change of pitch, etc. There is also a range of installations employing so-called disc or plate extrusion screw heads, which mix the material in a highly effective manner by virtue of the "Weissenberg" effect.

The object of the present invention is to improve an installation of this type by producing an assembly which enables very different products to be plasticised, as a result of good temperature regulation and the separation of non-plasticised particles, foreign bodies, etc.

SUMMARY OF THE INVENTION

To this end, the invention relates to an assembly of the type defined above, characterised in that the portions of the stator corresponding to the different zones are provided with temperature-regulating means each formed of a condenser, a heating device and an annular chamber surrounding the corresponding portion of the stator of which the temperature is regulated, the container thus formed containing a fluid which transfers heat as a result of a change of phase, the regulated temperature being fixed by the pressure prevailing in this chamber.

The invention is characterised by a plasticising module comprising:

a stator and an annular chamber of which the container contains a fluid which transfers heat as a result of a change of phase; the regulated temperature being fixed by the pressure prevailing in this container; and a feed screw extended by the plasticising disc; the assembly of the screw and freely floating disc, with a restrictor collar placed at the end of the plasticiser disc, the assembly ensuring hydro-dynamic balance inside the stator whilst the material is being worked.

This first independent module can operate alone as regards agro-alimentary products of the starchy type, proteoleaginous products and first use polymers.

The first module can be followed by a second module connected to the first such that the stator of the first module is extended by the stator of the second module with a cylindrical bore containing a screw, arranged in the first portion such that it can degas the extruded material. This screw is rotated mechanically by the end of the plasticiser disc.

In its corresponding portion, the screw separates out the non-molten material or foreign bodies remaining in the extruded material.

The second module complements perfectly the first module with respect to the working of the material to enable the mixed products to be used in order that their final technical properties can be improved.

This plasticising assembly enables the most diverse types of material to be plasticised since both the upstream and downstream temperatures of the plasticising head or "disc" are controlled automatically and very simply by virtue of the pressure of the self-regulating phase-changing cooling device. It is sufficient to determine the relation between the pressure and the temperature which is established in each assembly (this temperature depends not only on the phase-changing liquid but also on the properties (weight, thermal capacity, thermal conduction, etc.) of the materials constituting the stator, the screw and the disc, and which vary from one material to the other) to enable the temperature to be regulated very precisely, simply as a result of the pressure in the container, in which the heat exchange takes place as a result of phase changing, being regulated.

This plasticising process is complemented by the separation of non-plasticised particles, foreign bodies, etc., giving a thoroughly homogeneous paste at the outlet of the assembly. This paste no longer contains any bubbles or inclusions of air or gas since this gas has been separated out by degassing.

More particularly, the self-regulating cooling means of the disc consists of a peripheral jacket surrounding the stator at right angles to the disc and communicating with a chamber provided with a cooling means, a pressure-regulating means and a heating means cooperating with the cooling jacket and containing a liquid of which the phase changes (liquid-vapour) within the range of temperatures to be regulated.

BRIEF DESCRIPTION OF THE DRAWINGS

The present invention will be described in further detail below with reference to the appended drawings, in which.

DETAILED DESCRIPTION OF THE INVENTION

Figure 1A:
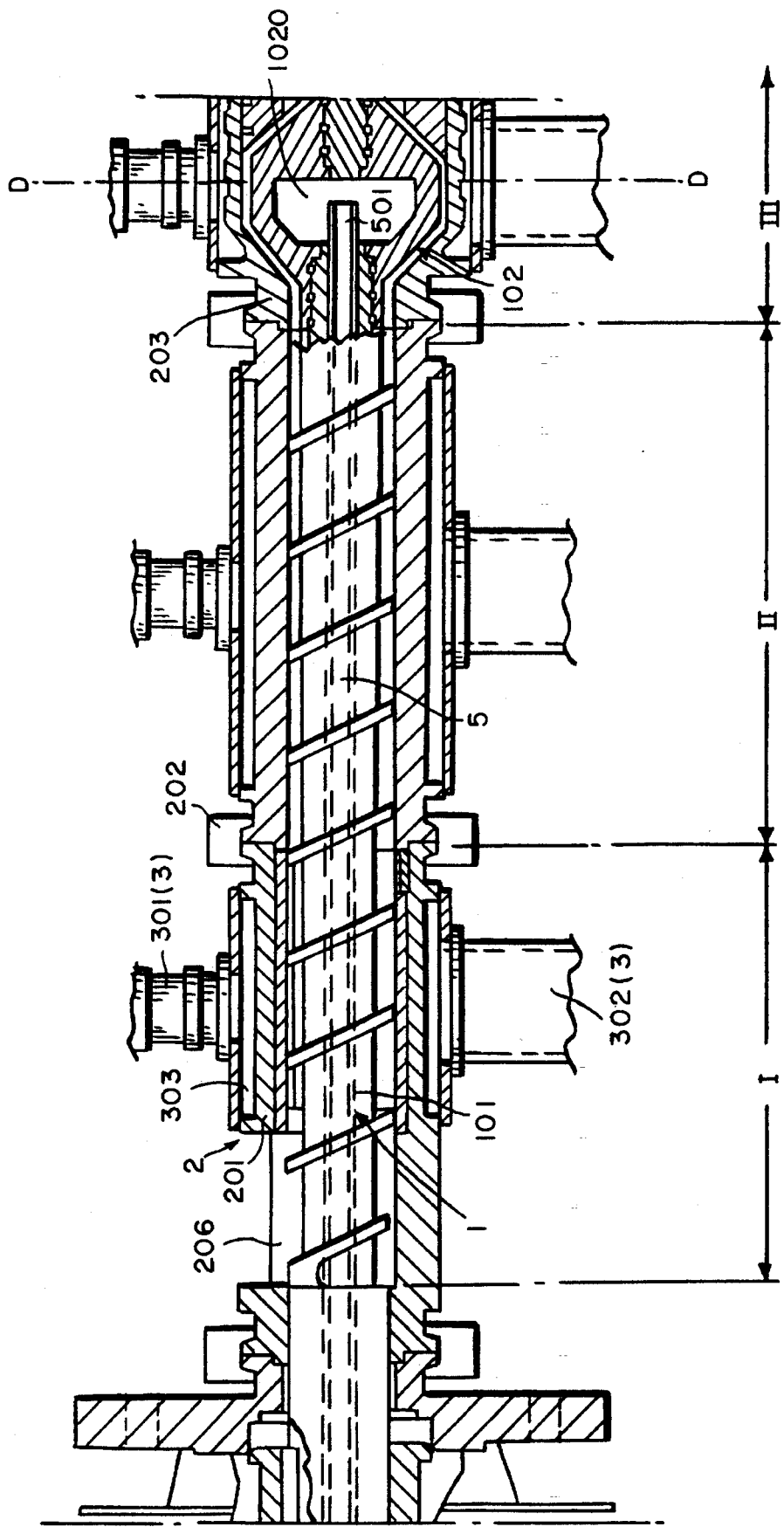
FIGS. 1A, 1B are schematic views in section of the assembly for continuous plasticising and filtration in accordance with the invention, FIG. 1A showing the first module of the machine and FIG. 1B its second module.
Figure 1B:
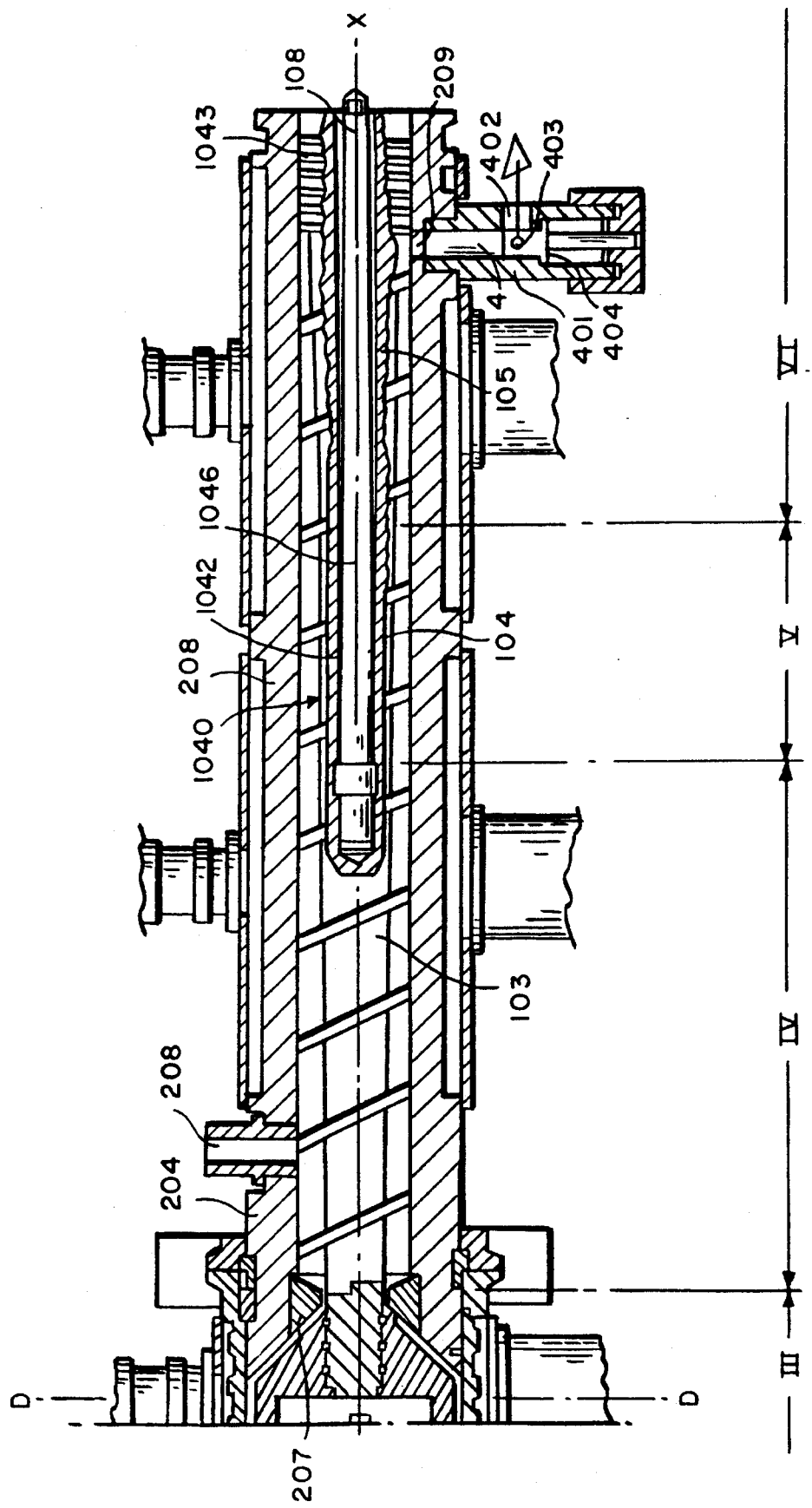

In accordance with FIGS. 1A, 1B which are juxtaposed along the line DD, from left to right and beyond the drive assembly (not illustrated), the plasticising and filtration assembly consists of a feed zone I connected to the homogenisation zone III by an intermediate zone II. The homogenisation zone III is followed by a degassing zone IV then by a filtration zone V and an outlet zone VI. The assembly is aligned along an axis XX about which the screw 1 in the stator 2 rotates.

FIG. 1A shows schematically the first module and FIG. 1B the second module of the plasticising assembly.

The screw 1, which is preferably floating, consists of a first portion 101 which is common to the zones I, II, a "disc" 102, a portion 103 for the zone IV, a portion 104 for the zone V and a portion 105 for the zone VI.

The stator consists of portions in the form of sleeves 201, 202, 203, 204, 205, corresponding to the zones I to VI and connected to one another along the axis XX. The different portions are provided with temperature-regulating devices composed of a condenser 301 and a heating device 302 associated with a respective annular chamber 303 of the stator. The temperature-regulating devices, distributed along the screw axis XX, regulate the temperature of the product circulating between the stator 2 and the screw 1 at each location. The devices are described with reference to FIG. 3.

The stator 2 has a bore which is cylindrical over its entire length except in the homogenisation zone III where it forms a housing for the disc screw.

For the supply, the stator comprises a feed aperture 206 on which there is mounted a hopper (not illustrated).

In the homngenisation zone III the portion 203 of the stator has a widened internal shape which is substantially biconical and defines a chamber accommodating the disc 102 by forming with the outer surface of the disc a peripheral spacing of which the cross-section develops in accordance with the treatment to which the material is to be subjected.

In its portion 203, this adaptation of the stator can be produced or completed by a restrictor collar consisting of an insert 207 constituting at the same time a wear part of the zone which is subject to a high level of erosion, at the disc outlet.

Downstream of the disc 102, in the zone IV, after the homogenisation of the material, is provided a degassing shaft 208.

The stator 2 does not have any particular features in the filtration zone V and outlet zone VI, apart from the device 4 for evacuating the non-molten material, in the stator portion 205. This device 4 consists of an endpiece 401 connected to the evacuation aperture 209 of the portion 205. This endpiece 401 comprises an aperture 402 controlled by a valve 403 which is subject to the action of a counterspring 404 regulated according to a specific drive.

When the pressure prevailing above the valve 403 is sufficient, it enables the valve to be pushed back to allow the non-molten material to escape via the aperture 402.

The righthand end of the stator is open, fluidtightness being provided by a threaded counterspring which will be described below.

The screw 1 accommodated in the stator 2 consists of a plurality of portions 101–105 of which the shape is adapted to the particular function of each portion.

At the inlet, in the feed zone I, the thread of the screw portion 101 takes up the material and transports it to the disc 102. This screw 101 is common to the two zones I, II.

On the interior, the screw is traversed by a cooling rod 5 which opens out via one end 501 into the chamber 1020 of the disc 102.

The disc 102 is in fact a member in the shape of a hollow two-cornered hat (chamber 1020) connected on each side to the portion of the screw upstream and downstream of the disc, as a result of being rotatably driven.

The portion 103 of the screw in the degassing zone IV has a base which rises slightly in the sense of circulation of the material such that a compression effect, assisting the degassing process, is created.

In the filtration zone IV, the screw 104 comprises a cavity 1040 defining a chamber 1042 into which open conduits 1041 (FIG. 2B) provided in the helix of the screw portion 104. The chamber 1042 forms a conduit for the filtered material towards the screw outlet 108.

The conduits 1041 constitute the filter: the molten material is sufficiently fluid to pass through the conduits 1041 whilst the non-molten material remains on the exterior and is transported by the screw to the non-molten material outlet aperture 209.

The screw/stator assembly is rendered fluidtight by the counterthread 1043. This thread has a pitch which is opposite to that of the upstream screw thread. As it rotates integrally with the screw assembly, it creates a forcing effect, conveying the non-molten material which passes through the aperture 209 to emerge from the stator.

Figure 2B:
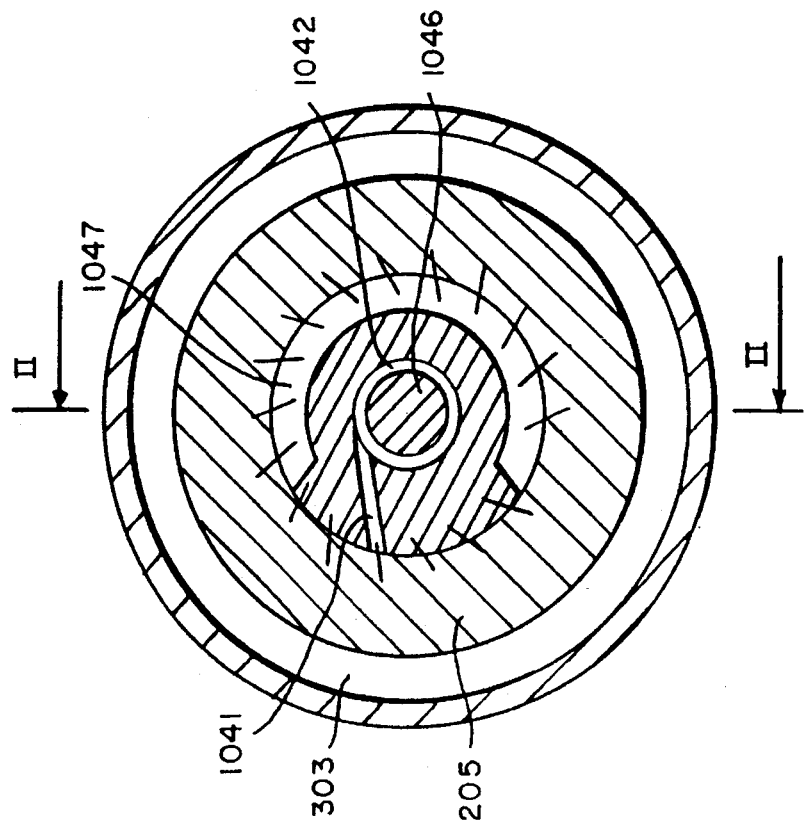
FIG. 2B is an axial section along the section III—III in FIGS. 1A and 1B.
Figure 2A:
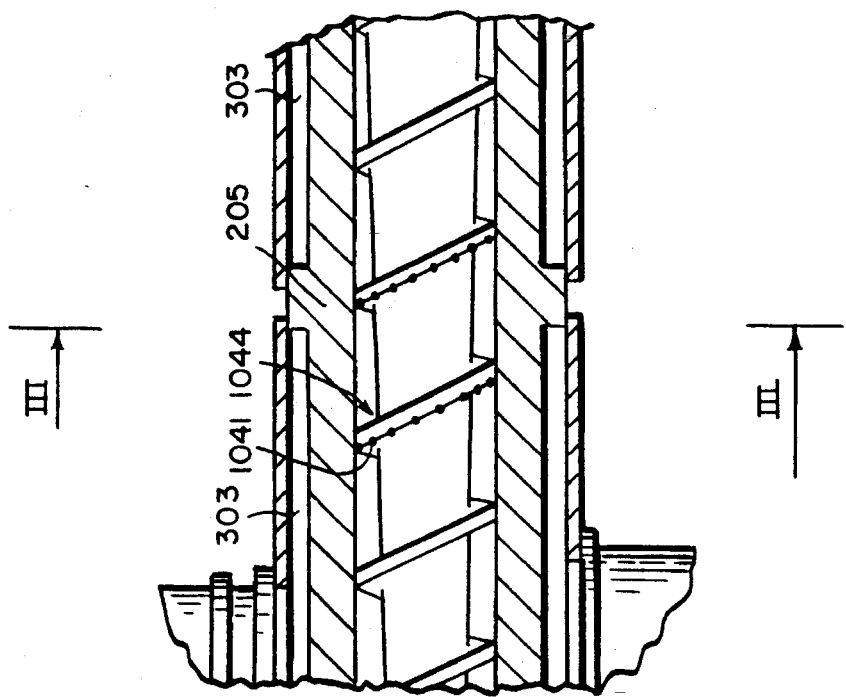
FIG. 2A is a view in section along the line II—II of FIG. 2B.

FIGS. 2A and 2B show in detail the filtering zone IV. In this zone IV, the thread 1044 comprises conduits 1041 which open out tangentially into the chamber 1042 defined between the interior of the screw portion 104 and an inner core 1046. FIG. 2B only shows one conduit 1041, the others being indicated by axis lines 1047. These conduits are directed tangentially in the chamber 1042, originating slightly on the side of the thread such that they are not obstructed by the inner wall of the stator portion 205. Preferably, the conduits 1041 open out in the vicinity of the stator wall 205 and not at the base of the groove within the screw thread since the material may not be at the correct temperature and, moreover, this base is occupied by the non-molten material.

FIGS. 2A and 2B likewise show the annular chamber 303 of the temperature-regulating device.

Figure 3:
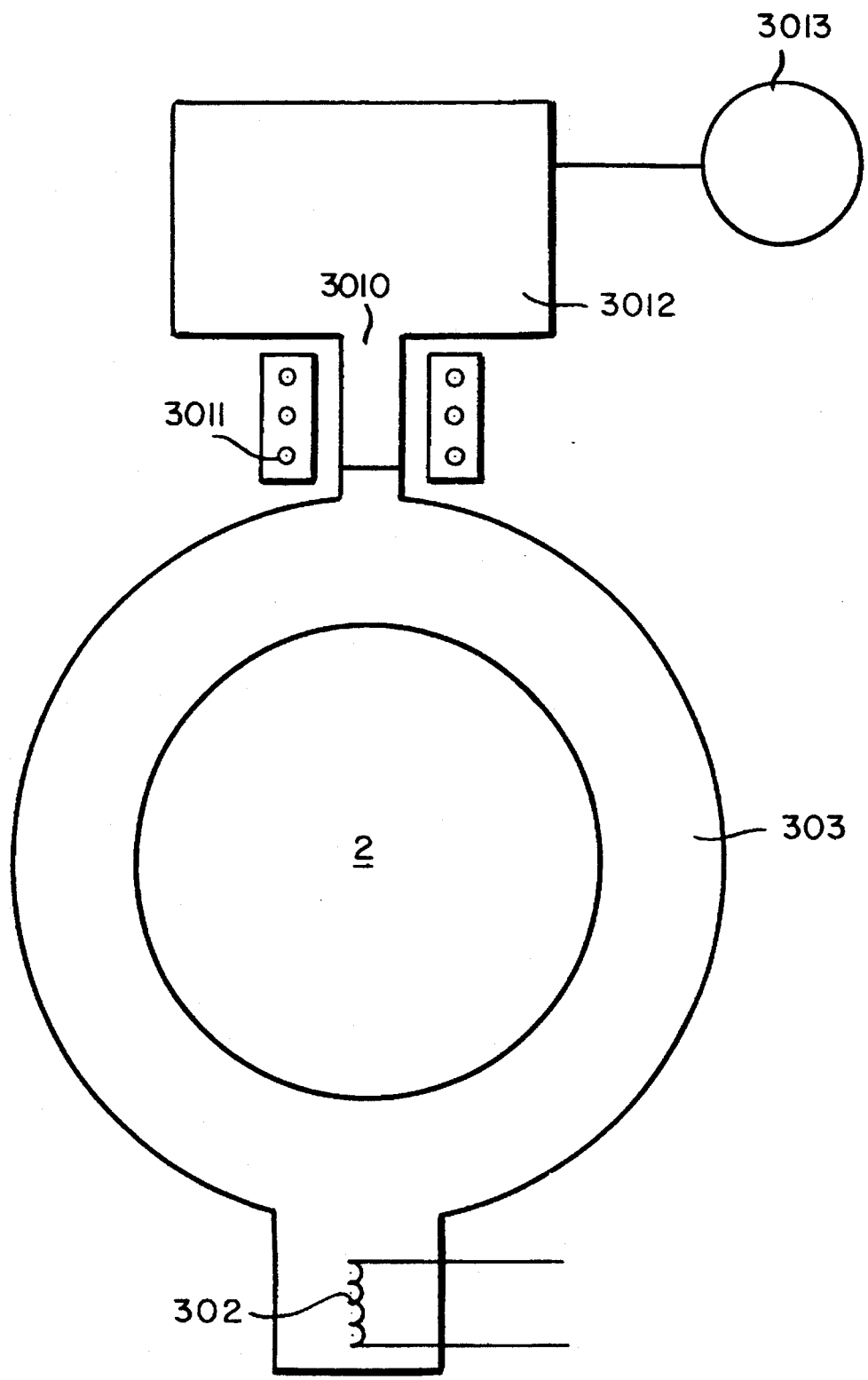
FIG. 3 is a schematic view of the device for cooling the disc of the assembly shown in FIGS. 1A and 1B.

FIG. 3 shows schematically the structure of an automatic temperature-regulating device.

The stator 2 is represented by a circle surrounded by the annular chamber 303 terminating at the bottom in the heating device 302 represented by a heated resistor and at the top in the condenser 301 comprising a conduit 3010 likewise surrounded by a cooling means 3011 independent of the device 302 and continuing in the form of a chamber 3012 provided with a pressure control member 3013 which controls the pressure prevailing in the chamber 3012 and consequently the temperature in the annular space 303.

A coolant is contained in the volume thus formed. This liquid changes state; it evaporates and condenses, exchanging its latent heat.

Figure 4:
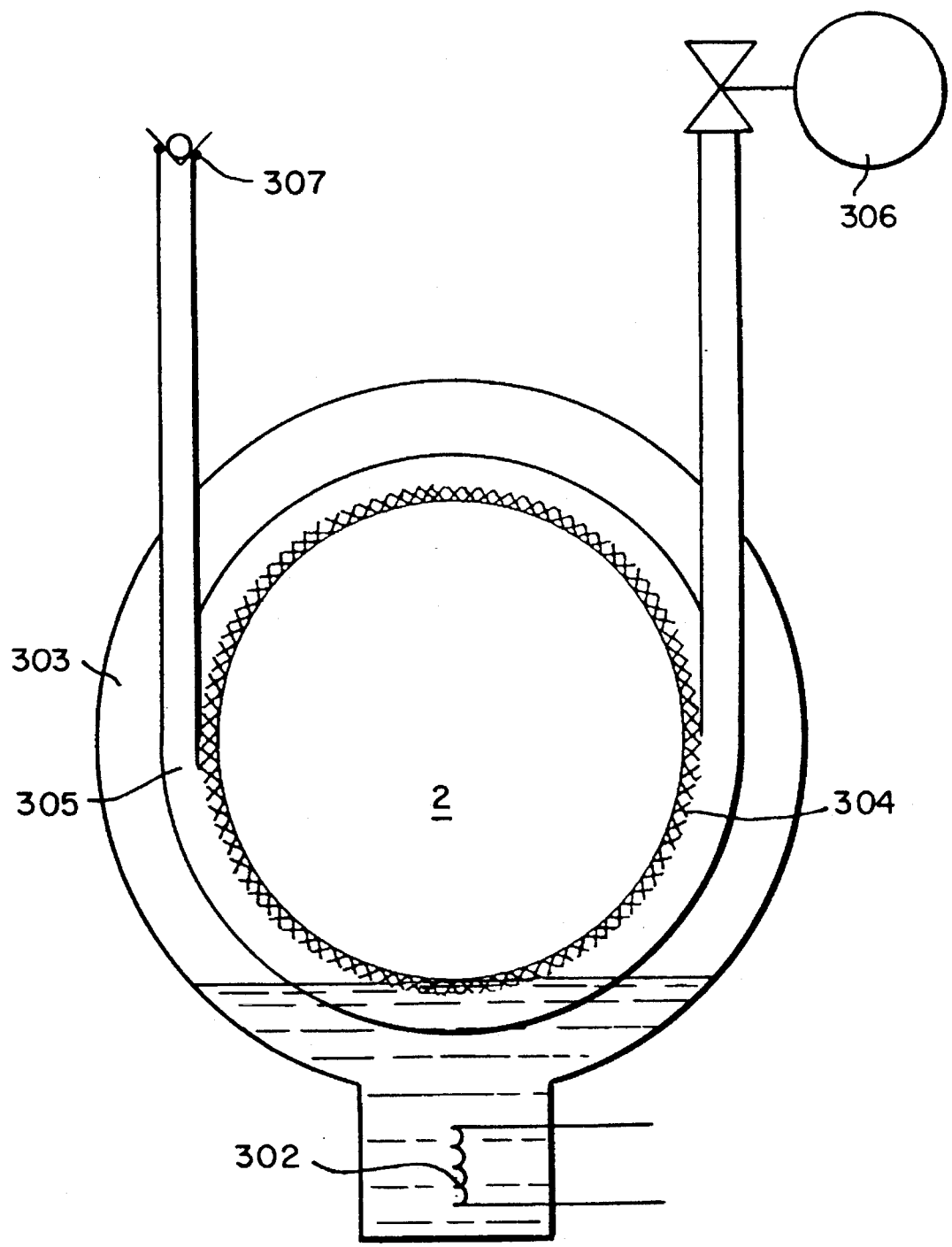
FIG. 4 shows schematically a different embodiment of the cooling device.

FIG. 4 shows a further different embodiment of a phase-changing and automatic regulating device which regulates the external temperature. The stator 2 is represented by a circle surrounded by the annular chamber 302 terminating at the bottom in the heating device 302 represented by a heated resistor. This heating device is a low-power device. The stator 2 is surrounded by a capillary fabric 304 and a coil 305 with windings which are not touching for the circulation of the heat-transferring fluid which ensures cooling as a result of evaporation (change of phase of the coolant in the capillary material).

The condensation over the coil discharges the heat to the coolant. The condensates return to the capillary material. The temperature is regulated by means of a temperature-regulating pressostat device acting on a solenoid valve 306 which ensures that the coolant flows in the condenser coil.

A non-return valve 307 located upstream of the coil with the solenoid valve 306 located downstream of the toll prevent any evaporation the fluid in the coil and thus prevent the coil becoming furred.

The plasticising assembly according to the invention enables highly diverse types of material to be processed, such as polymers in the pasty, viscous or molten state, as well as products such as starch for the manufacture of very different products, with recycling of the recovery materials or manufacturing of biodegradable products.

What is claimed is:

1. Assembly for the continuous plasticising and filtration of materials, comprising:

a plasticising module and a degassing and filtration module, and a stator comprising a floating screw and, in succession, a feed zone receiving material to be plasticised, a homogenisation zone, a degassing zone, a zone for the filtration of the non-molten material, and a zone for the outlet of plasticised material, the stator and the floating screw being constructed in a plurality of portions corresponding to each of the zones, and the screw having a plasticising disc, wherein the portions of the stator corresponding to the zones are provided with temperature-regulating means, each formed of a condenser, a heating device, and an annular chamber surrounding the portion of the stator wherein the temperature is regulated, the annular chamber containing a fluid which transfers heat as a result of a change of phase, the temperature being determined by pressure in the annular chamber, wherein a portion of the screw in the filtration zone is a cavity defining a chamber into which conduits are opened, said conduits are sized to allow only molten material to pass and are formed in the helices of the screw, and the stator, adjacent to the outlet zone and downstream of the filtration zone, includes a device for evacuating non-molten material comprising a valve which is subject to the action of a counterspring.

2. (Amended) The assembly as claimed in claim 1, wherein the chamber is an annular space between the cavity and a core that opens out at a screw outlet.

3. The assembly as claimed in claim 1, wherein the screw comprises a counterthread in the outlet zone.

4. The assembly as claimed in claim 1, wherein the temperature-regulating device includes an annular chamber, provided with a heating device and a condenser with a conduit surrounded by at least one heating means and opening out into a chamber equipped with a pressure control member.

5. Assembly for the continuous plasticising and filtration of materials, comprising:

a plasticising module and a degassing and filtration module, and a stator comprising a floating screw and, in succession, a feed zone receiving material to be plasticised, a homogenisation zone, a degassing zone, a zone for the filtration of the non-molten material, and a zone for the outlet of plasticised material, the stator and the floating screw being constructed in a plurality of portions corresponding to each of the zones, and the screw having a plasticising disc, wherein the portions of the stator corresponding to the zones are provided with temperature-regulating means, each formed of a condenser, a heating device, and an annular chamber surrounding the portion of the stator wherein the temperature is regulated, the annular chamber containing a fluid which transfers heat as a result of a change of phase, the temperature being determined by pressure in the annular chamber, wherein a portion of the screw in the filtration zone is a cavity defining a chamber into which conduits are opened, said conduits are sized to allow only molten material to pass and are formed in the helices of the screw, and the temperature-regulating device includes an annular chamber, provided with a heating device and a condenser with a conduit surrounded by at least one heating means and opening out into a chamber equipped with a pressure control member.

6. The assembly as claimed in claim 5, wherein the stator adjacent to the outlet zone and downstream of the filtration zone, includes a device for evacuating non-molten material comprising a valve which is subject to the action of a counterspring.

7. The assembly as claimed in claim 5, wherein the chamber is an annular space between the cavity and a core that opens out at a screw outlet.

8. The assembly as claimed in claim 5, wherein the screw comprises a counterthread in the outlet zone.

* * * * *